(12) United States Patent
Forin

(10) Patent No.: US 6,397,920 B1
(45) Date of Patent: *Jun. 4, 2002

(54) NETWORK WITH VARIABLE OPENING FACTOR FOR CONSTITUTING LIGHT ALTERNATING SCREENS

(75) Inventor: Roger Forin, Seynod (FR)

(73) Assignee: Hexcel Fabrics (Societe Anonyme), Villeurbanne (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/403,046

(22) PCT Filed: Feb. 26, 1999

(86) PCT No.: PCT/FR99/00447

§ 371 (c)(1),
(2), (4) Date: Dec. 13, 1999

(87) PCT Pub. No.: WO99/43879

PCT Pub. Date: Sep. 2, 1999

(30) Foreign Application Priority Data

Feb. 27, 1998 (FR) .............................................. 98 02650

(51) Int. Cl.$^7$ ................................................. A47G 5/02
(52) U.S. Cl. ..................... 160/238; 160/237; 139/383 R
(58) Field of Search ................................ 160/238, 237, 160/DIG. 7, 120, 121.1; 139/389, 383 R

(56) References Cited

U.S. PATENT DOCUMENTS

| | | | | |
|---|---|---|---|---|
| 926,200 A | * | 6/1909 | Longstreet .............. 139/383 R |
| 1,828,678 A | * | 10/1931 | Peterman et al. ......... 160/349.1 |
| 2,037,629 A | * | 4/1936 | Holgate ...................... 160/237 |
| 2,079,831 A | * | 5/1937 | Bauer et al. ............. 139/383 R |
| 2,125,422 A | * | 8/1938 | Bosworth ................... 160/237 |
| 2,817,371 A | * | 12/1957 | Bussiere .................. 139/383 R |
| 3,696,845 A | * | 10/1972 | Acker et al. ............. 139/383 R |
| 3,822,727 A | * | 7/1974 | Small et al. ............. 139/383 R |
| 4,002,188 A | * | 1/1977 | Hanks ............... 160/DIG. 7 X |
| 4,582,109 A | * | 4/1986 | Fairbanks ................ 160/84.01 |
| 4,789,582 A | * | 12/1988 | Brill et al. .............. 160/237 X |
| 5,007,125 A | | 4/1991 | Owenby |
| 5,131,434 A | * | 7/1992 | Krummheuer et al. .. 139/383 R |

FOREIGN PATENT DOCUMENTS

| | | |
|---|---|---|
| DE | 3609845 | 9/1987 |
| FR | 2307064 | 11/1976 |
| GB | 624668 | 11/1994 |
| NL | 9500121 | 11/1995 |

* cited by examiner

*Primary Examiner*—David M. Purol
(74) *Attorney, Agent, or Firm*—Dennison, Schultz & Dougherty

(57) ABSTRACT

A mesh web is characterized in that it has interlaced threads providing meshes that define locally a zone (5a or 5b) having a mesh void factor that is different from that of the remainder of the web. It is applicable to make light-attenuating binds.

10 Claims, 2 Drawing Sheets

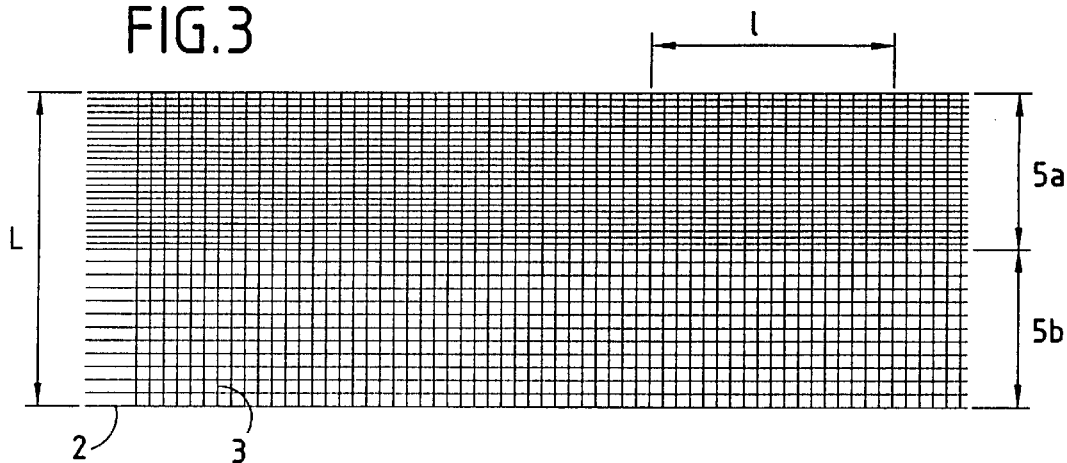
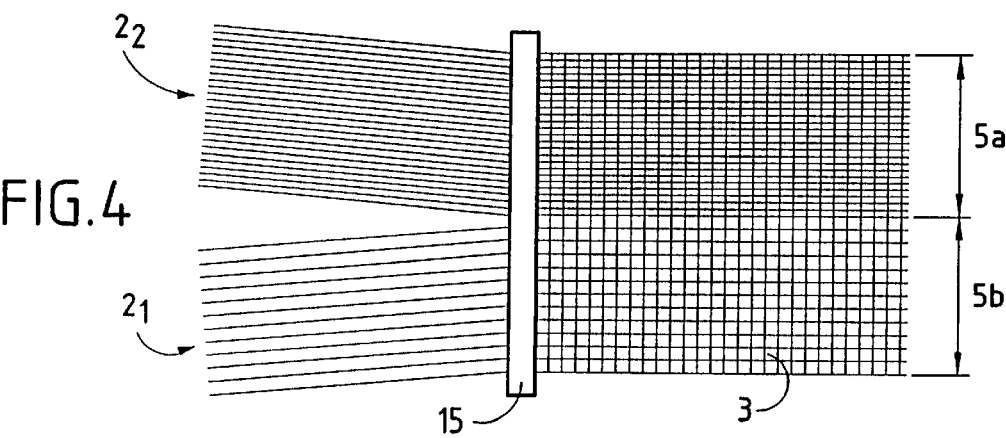
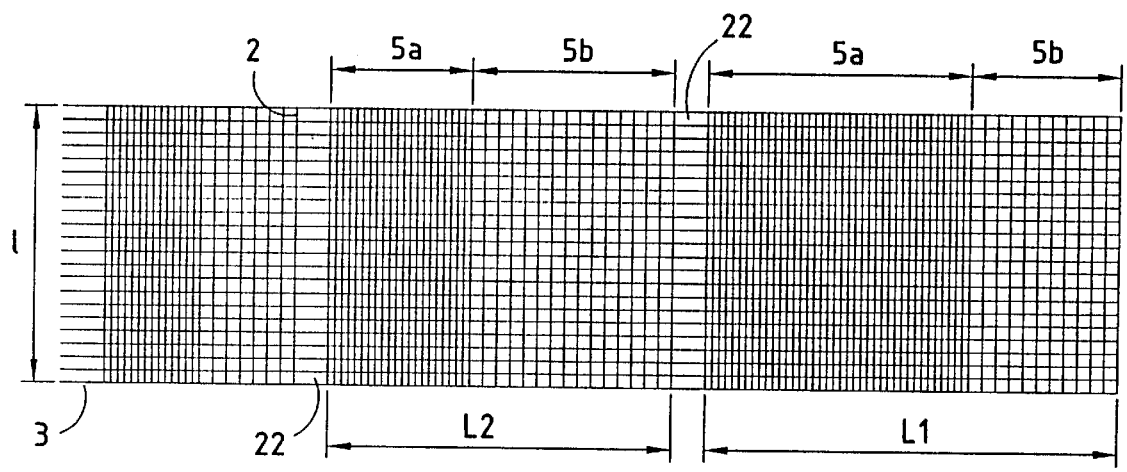

NETWORK WITH VARIABLE OPENING FACTOR FOR CONSTITUTING LIGHT ALTERNATING SCREENS

TECHNICAL FIELD

The present invention relates to the field of webs that can be made by weaving threads so as to posses a determined void factor. In the meaning of the invention, it should be assumed that the interlaced threads of such webs define meshes of selected void factor, but without the term "mesh" necessarily indicating that the subject matter of the invention is directed essentially towards webs that have been obtained not by weaving but by knitting, to give rise to the meshes being formed by interlaced thread(s). [Translator's note: the French word for "mesh", i.e. maille, is also a synonym for "knitting"].

The invention relates to meshed webs for constituting blinds or curtains in panels and/or strips that can be used indoors or outdoors relative to one or more windows or the like.

Such curtains or blinds generally serve to attenuate the amount of light that passes in the event of bright light and/or to constitute a kind of screen that provides a contribution to thermal insulation, particularly when such screens are placed on the outside of such windows.

PRIOR ART

Webs of the above type are generally coated in a thermoplastic material, either by prior-coating of the threads or by coating the web by soaking, with such coating being intended to give appropriate resistance to aging, more particularly when installation is to be on the outside. Coating should also generally be considered as having a specific bonding function so as to establish heat sealing bonds between the interlaced threads which are woven using a weave which can be of any kind insofar as it allows a non-negligible void factor to remain, of the type to be found in articles sold as screens for attenuating the passage of light.

In such applications, it must be understood that curtains and stores of the above-type can be considered as providing satisfaction for one and/or the other of the attenuation and thermal insulation functions.

Nevertheless, for some time the need has been felt for a web that possesses a void factor that is not constant so as to be able to make advantage of greater or lesser passage or absorption of light in some determined zone whose specific location depends essentially on the application.

In the meaning of the invention, the determined zone in question can be that situated at the bottom of the curtain or blind or indeed the top thereof, and in some cases, the middle portion of the curtain or blind when it is in its deployed or unrolled state. It can be considered that the prior art does not at present enable such a need to be satisfied, at any rate to the knowledge of the Applicant. The object of the invention is specifically to mitigate that omission and to make it possible to supply a meshed web that can be made so as to produce a local portion having a different void factor in a clearly defined zone, or on the contrary in which variation takes place progressively.

SUMMARY OF THE INVENTION

To achieve the intended objects, the web of the invention for constituting a screen having the function of attenuating light and/or of providing thermal insulation is characterized in that it is made up of two sheets of threads of organic or inorganic material that are interlaced to define meshes, locally defining a zone that has a mesh void factor that is different from that of the remainder of the web.

Various other characteristics appear from the following description given with reference to the accompanying drawings which show embodiments of the invention as non-limiting examples.

BRIEF DESCRIPTION OF THE DRAWINGS

FIG. 3 is a fragmentary plan view of a web constituting an embodiment.

FIGS. 4 to 6 are fragmentary plan views showing different ways of making the web of the invention.

FIG. 1 is a fragmentary view of a web 1 which is constituted by weaving a first sheet of threads 2 that are interlaced with a second sheet of threads 3. In the example shown diagrammatically, the weaving makes use of a taffeta or preferably a plain type weave, without the specific wave being considered as an essential defining element in the meaning of the invention. On the contrary, any appropriate weave can be used, providing the method of weaving selected makes it possible to leave open meshes 4 between the interlaced sheets of threads 2 and 3 so as to define a void factor for the web 1.

Figure 1:
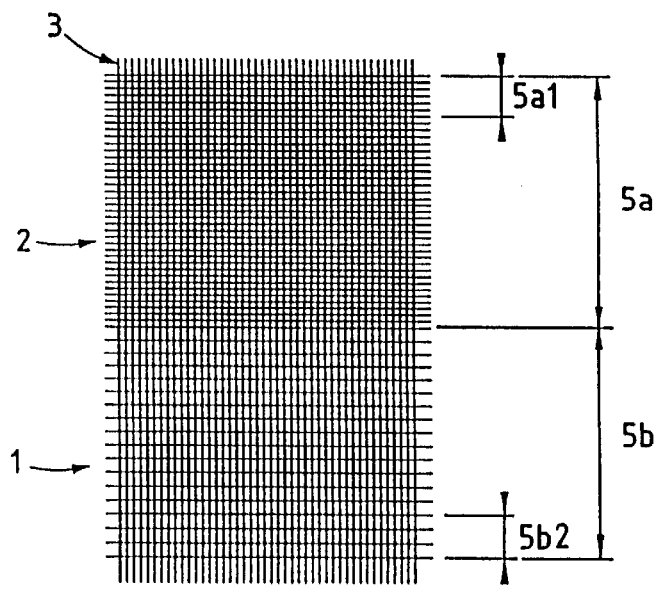
FIG. 1 is an view of a web in which the dispositions of the invention are applied.

The sheets 2 and 3 are based on threads of organic material or of inorganic material. In the meaning of the invention, provision is made for the local concentration, e.g. of threads constituting the sheet 2, to be selected in such a manner that the resulting fabric has spacing between the threads of the sheet 2 in a zone such as 5a that is smaller than the spacing between them in a zone 5b. However the threads of the sheet 3 remain at constant spacing, e.g. equal to that presented by the threads constituting the zone 5a.

Thus, as can be seen in FIG. 1, the web given overall reference 1 possesses a zone 5a in which its void factor can be said to be "small" compared with a "large" void factor presented by its zone 5b. In the meaning of the invention, it must be understood that it is possible to select a thread concentration, e.g. for the sheet 2, in a plurality of zones that are optionally separate from one another so that they have spacings that are equivalent or different, so that more than two zones 5a and/or 5b can optionally be provided.

It should also be understood that the invention relates to selecting a fabric so that the spacing between the threads, e.g. in the sheet 2, varies progressively, e.g. from the zone $5a_1$ to the zone $5b_2$ in such a manner that the $5b_2$ has a void factor that is greater than that of the zone $5a_1$.

It must also be understood in the meaning of the invention that the variation in the spacing need not be constant, for example a certain amount of recurrence may be involved in the succession. In the preferred applications mentioned below, it can be considered that the void factor of the zone 5a can be about 2%, or preferably 5%, while the void factor of the zone 5b can be as much as 20% and preferably lies around 15%.

Figure 2:
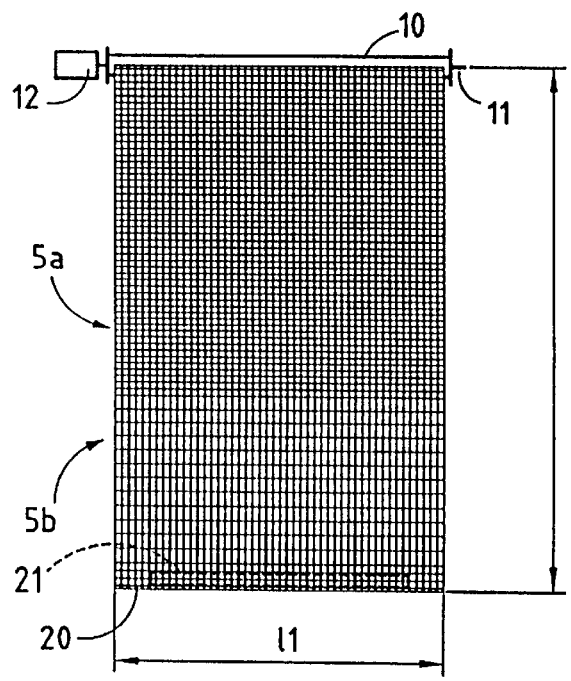
FIG. 2 is a diagramatic elevation showing a preferred application of the invention.
Figure 5:
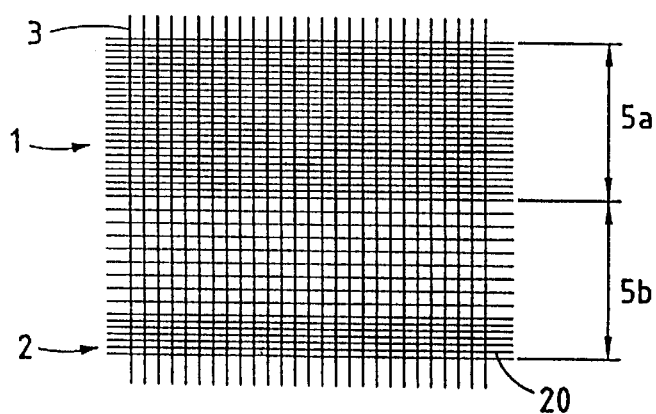

FIG. 2 shows an example of an application in making a screen or curtain that is designed to constitute a light attenuator or a thermal insulator, in which case it is placed on the outside of a window that it is intended to cover.

A portion or panel of the web 1 is cut to appropriate dimensions to enable it to be connected, e.g. in the margin $5a_1$ of the zone 5a, to a wind-up core 10 mounted on axles 11 and suitable for being reversibly rotated by a mechanism 12 under manual or electrical control. The core 10 serves to wind in or out the panel of the web 1, as shown in FIG. 2, so that when it is in the unwound state, the zone 5a is situated immediately after the core 10 while the zone 5b is to be found towards the bottom portion of the window that is to be covered.

In this way, one light attenuation factor acts in the zone 5a while the zone 5b allows light to pass in a manner that is suitable for ensuring sufficient comfort and illumination without the people occupying premises fitted with such a curtain running any risk of being dazzled.

In such an application, a panel is often organized so that its zone 5a occupies abut two-thirds of the height H of the unwound curtain while the zone 5b occupies the remaining third.

It should naturally be considered that the above values are not essential in the meaning of the invention and that depending on the particular application, manufacturers can provide different extents for the zones 5a and 5b. The same naturally applies if the number of zones having different void factors is greater than two.

BEST METHOD OF IMPLEMENTING THE INVENTION

A web 1 satisfying the above characteristics can be made in various different ways. One of the best techniques consists in warping the sheet 2 which constitutes the sheet of warp threads over a width L corresponding substantially to a maximum future height H in use, as shown in FIG. 2 when the use consists in making a blind or a curtain capable of covering windows or glazed areas having standardized dimensional characteristics.

As shown in FIG. 3, the way in which the sheet of threads 2 constituting the warp are set up gives rise to the concentration of these threads varying, e.g. in two zones 5a and 5b respectively, so as to have a small void factor and a large void factor. In the example, the zones 5a and 5b are substantially equivalent in transverse extent, but it should naturally be understood that within the meaning of the invention these extents can be different and can vary from one product to another as concerns the zones 5a and 5b. Similarly, it can be seen that the concentration of warp threads is constant within each of the zones 5a and 5b. This could be quite different by providing for concentration to vary progressively or degressively in one or other of the zones, or indeed successively from one zone to another when the width L is occupied by a number of zones greater than two.

The sheet of threads 2 can be established by using a single warp beam as shown in FIG. 3, or by using two or more as shown in FIG. 4. Under such circumstances, it can be advantageous to provide specific guidance for the threads of the sheet portions corresponding to the zones 5a and 5b by means of a comb 15 or the like. The weaving of the web after the sheet of warp threads has been established then relies on the threads constituting the sheet 3 being inserted so as to form weft threads in this example. This insertion takes place with the amount of void provided by the warp threads varying as a function of the selected weave, and all such dispositions come within the competence of the person skilled in the art.

The web is woven in conventional manner on such a basis, and after it has been coated, it can be rolled up to constitute spools, and it can be used on being unrolled, being cut parallel to the weft threads 3 so that a unit width 1 corresponds to the width of a blind or curtain as finally made.

In other words, the web is woven in such a manner that on being cut transversely it is possible to provide panels that correspond to the dimensional characteristics required for making blinds or curtains, each panel corresponding to and satisfying the requirement for at least one zone being present that has a void factor that is different from the void factor of the remainder of the panel.

In such an implementation, it can be considered that the strip obtained during manufacture of the web provides mechanical behavior that is unsuitable for allowing winding up to take place appropriately because of a mechanical response to traction forces that varies locally.

To make such a response more uniform, it is advantageous in the invention to provide the web in such a manner as to cause the margin of the zone 5b having a large void factor to include a border 20 whose component warp threads are at a concentration that is close or identical to that presented by the zone 5a having a small void factor. In this way, the resulting strip has two margins whose mechanical behavior is similar if not identical, thereby making it possible for subsequent manipulations, windings, or treatments to be performed without risk of deformation.

In the meaning of the invention, this implementation is also advantageously used to confer sufficient mechanical strength to the portion $5b_2$ occupied by the margin 20 to make it easy either to fix the panel to a winding and unwinding core such as 10, or else to fix it to a load bar 21 as shown in FIG. 2.

In this first implementation, as can be seen from the above, the strip of web or cloth that is obtained can easily be cut transversely over a width which corresponds to the length of the strip under consideration relative to its production direction so as to provide a unit part of size in the direction 1 is selected during cutting to correspond to the width of the curtain or blind that is to be made in the end in the intended application. Such a unit part or panel can then easily be fitted to the core 10 in one direction or the other so that in the unwound state the zone having a small or a large void factor is at the top or else at the bottom, depending on the intended application. FIG. 6 is a diagram showing another method of manufacturing the web on the basis of a sheet of warp threads using the threads 3 which in the previous example were derived from weft threads. In this example, the threads 3 are set up so as to be spaced apart at a constant spacing over the entire width 1 which may optionally correspond, for example, to the future width in use of a curtain for covering a window and satisfying standardized dimensional characteristics as can be seen in FIG. 2. The web is obtained by subsequently proceeding with the insertion of the threads 2 that now constitute the weft threads and with this insertion being performed at a pitch suitable for obtaining varying void factors in successive zones such as 5a and 5b. FIG. 6 shows an embodiment in which the insertion program makes it possible to obtain a segment of strip L1 that includes two zones 5a and 5b, and a shorter segment L2 that likewise possesses two zones 5a and 5b which are nevertheless organized to cover extents that are different from those of the segment L1.

In such a method, it is thus the concentration and the pitch of the weft threads 2 that enable zones of varying void factor to be obtained. Consequently, manufacture of this type makes it possible to obtain a succession of segments L1 to Ln that can be separated from one another by cutting strips 22 for facilitating subsequent utilization. It must be understood that in the meaning of the invention the initial web can be cut so as to produce the kind of strips that are used in conventional manner for making up a screen.

The invention is not limited to the examples described and shown, since various modifications can be applied thereto without going beyond its ambit.

INDUSTRIAL APPLICATION

Although the web of the invention can be implemented for various screen applications, a preferred application is that concerning the manufacture of screen-curtains for attenuating light.

What is claimed is:

1. A light attenuating screen constructed and arranged for hanging over a vertically defined height and a horizontally defined width, and comprising at least one zone of greater light attenuation across the width of the screen substantially in its entirety disposed horizontally above at least one zone of lesser light attenuation across the width of the screen substantially in its entirety, said screen comprising a web of varying mesh size comprising vertically disposed threads and horizontally disposed threads of organic or inorganic material that are interwoven to define a mesh having said zones, wherein only the horizontally disposed threads vary in spacing with each other to create after said interweaving said zones.

2. A screen according to claim 1, wherein the spacing of the threads varies progressively.

3. A screen according to claim 1, comprising a first zone of small mesh size and a second zone of large mesh size.

4. A screen according to claim 3, wherein the zone of small mesh size has warp threads at a concentration higher than that of the zone having a large mesh size.

5. A screen according to claim 3, wherein the zone having a small mesh size has weft threads at a concentration higher the that of the zone of large mesh size.

6. A screen according to claim 1, comprising a zone of small mesh size and a zone of large mesh size bordered by a margin having a small mesh size.

7. A screen according to claim 1, wherein the zones contain 2 to 20% void area.

8. A screen according to claim 1, additionally comprising a roll-up bar.

9. A screen according to claim 1, additionally comprising a load bar.

10. A screen according to claim 1, additionally comprising a roll-up bar and a load bar.

* * * * *